United States Patent
Guarda et al.

(10) Patent No.: US 8,999,192 B2
(45) Date of Patent: Apr. 7, 2015

(54) METHOD FOR TRANSFERRING HEAT

(75) Inventors: Pier Antonio Guarda, Arese (IT); Gianfranco Spataro, Lissone (IT); Padmanabhan Srinivasan, Milan (IT); Giuseppe Marchionni, Milan (IT)

(73) Assignee: Solvay Specialty Polymers Italy S.p.A., Bollate (Milan) (IT)

( * ) Notice: Subject to any disclaimer, the term of this patent is extended or adjusted under 35 U.S.C. 154(b) by 610 days.

(21) Appl. No.: 13/120,482

(22) PCT Filed: Sep. 22, 2009

(86) PCT No.: PCT/EP2009/062232
§ 371 (c)(1), (2), (4) Date: Mar. 23, 2011

(87) PCT Pub. No.: WO2010/034698
PCT Pub. Date: Apr. 1, 2010

(65) Prior Publication Data
US 2011/0175016 A1   Jul. 21, 2011

(30) Foreign Application Priority Data
Sep. 26, 2008  (EP) ................ 08165288

(51) Int. Cl.
  C09K 5/00   (2006.01)
  C09K 3/18   (2006.01)
  C09K 5/10   (2006.01)

(52) U.S. Cl.
  CPC ..................... *C09K 5/10* (2013.01)

(58) Field of Classification Search
  USPC ........ 252/67, 68, 69, 71, 73, 74, 75, 77, 78.1, 252/570
  See application file for complete search history.

(56) References Cited

U.S. PATENT DOCUMENTS

| | | | |
|---|---|---|---|
| 3,784,471 A | 1/1974 | Kaiser | |
| 4,472,290 A | 9/1984 | Caporiccio et al. | |
| 4,760,198 A | 7/1988 | Bierschenk et al. | |
| 5,000,864 A | 3/1991 | Strepparola et al. | |
| 5,083,082 A * | 1/1992 | Bargigia et al. | 324/750.05 |
| 5,124,058 A | 6/1992 | Corti et al. | |
| 5,221,494 A * | 6/1993 | Ikeda et al. | 252/68 |
| 5,281,695 A * | 1/1994 | Kishita et al. | 528/401 |
| 5,718,833 A | 2/1998 | Yamamoto et al. | |
| 5,738,802 A | 4/1998 | Yamamoto et al. | |
| 5,785,882 A | 7/1998 | Yamamoto et al. | |
| 6,432,320 B1 * | 8/2002 | Bonsignore et al. | 252/70 |
| 6,869,920 B2 * | 3/2005 | Marchionni et al. | 508/582 |
| 6,953,082 B2 * | 10/2005 | Costello et al. | 165/80.4 |
| 6,982,173 B2 * | 1/2006 | Marchionni et al. | 436/135 |
| 7,115,783 B2 * | 10/2006 | Marchionni et al. | 568/615 |
| 7,132,574 B2 * | 11/2006 | Picozzi et al. | 568/615 |
| 7,803,284 B2 * | 9/2010 | Petricci et al. | 252/78.1 |
| 8,258,090 B2 * | 9/2012 | Avataneo et al. | 508/582 |
| 8,278,256 B2 * | 10/2012 | Marchionni et al. | 508/582 |
| 2003/0196727 A1 | 10/2003 | Maccone | |
| 2003/0203823 A1 | 10/2003 | Navarrini et al. | |
| 2004/0235685 A1 | 11/2004 | Russo et al. | |
| 2005/0126756 A1 | 6/2005 | Costello et al. | |
| 2006/0163532 A1 * | 7/2006 | D'Aprile et al. | 252/182.11 |
| 2007/0051916 A1 | 3/2007 | Flynn et al. | |
| 2007/0187639 A1 | 8/2007 | Leck et al. | |

FOREIGN PATENT DOCUMENTS

| | | |
|---|---|---|
| JP | 2614739 B2 | 5/1997 |
| WO | WO 2007099055 A2 | 9/2007 |
| WO | WO 2009019267 A2 | 2/2009 |

* cited by examiner

*Primary Examiner* — Jane L Stanley
(74) *Attorney, Agent, or Firm* — Osha Liang LLP

(57) ABSTRACT

A process for transferring heat from a heat source to a heat sink, comprising using as heat transfer medium a composition comprising: at least one fluorinated fluid free from functional groups (fluid (H)); at least one functional (per)fluoropolyether (functional PFPE(1)) comprising recurring units (R1), said recurring units comprising at least one ether linkage in the main chain and at least one fluorine atom (fluoropolyoxyalkylene chain), and at least one functional end group chosen between —COOH and —CONH$_2$; at least one functional (per)fluoropolyether (functional PFPE(2)) comprising recurring units (R1) as defined above and at least one functional end group chosen between —COCF$_3$ and its hydroxylated derivative —C(OH)$_2$CF$_3$.

13 Claims, No Drawings

METHOD FOR TRANSFERRING HEAT

CROSS-REFERENCE TO RELATED APPLICATIONS

This application is a U.S. national stage entry under 35 U.S.C. §371 of International Application No. PCT/EP2009/062232 filed Sep. 22, 2009, which claims priority to European Application No. 08165288.5 filed Sep. 26, 2008, this application being herein incorporated by reference in its entirety for all purposes.

TECHNICAL FIELD

The present invention relates to the use of fluorinated fluid compositions as heat transfer media having improved thermal conductivity and corrosion protection in a variety of heat transfer dependant applications.

BACKGROUND ART

Heat transfer fluids are known in the art to be used in heating and cooling systems; typically, said heat transfer media include water, aqueous brines, alcohols, glycols, ammonia, hydrocarbons, ethers and various halogen derivatives of these materials, such as chlorofluorocarbons (CFCs), hydrochlorofluorocarbons (HFCs), (per)fluorinated polyethers (PFPEs) and the like.

Such fluids are used to transfer heat from one body to another, typically from a heat source (e.g., a vehicle engine, a boiler, a computer chip or a refrigerator) to a heat sink so as to effect cooling of the heat source, heating of the heat sink or to remove unwanted heat generated by the heat source. The heat transfer medium provides a thermal path between the heat source and the heat sink; it may be circulated through a loop system or other flow system to improve heat flow or it can be in direct contact with heat source and heat sink.

Fluorinated fluids, thanks to their high chemical and thermal stability, non toxicity and non flammability, are particularly suited for applications in heat transfer circuits where such properties, in particular the non flammability, are extremely important due to high safety standards; examples thereof are cooling circuits on board of aircrafts, refrigeration systems for supermarkets or heat transfer circuits in industrial plants.

In particular, fluorinated ether fluids like, notably, (hydro)fluoro(poly)ethers are broadly used as heat transfer media due to their wide liquid range, especially for applications as low temperature secondary refrigerants for use in secondary loop refrigeration systems where the viscosity of the fluid should not be too high at the operating temperatures.

Thus, US 2007/0187639 (E. I. DU PONT DE NEMOURS & CO) 16 Aug. 2007 discloses a heat-transfer fluid composition including a heat-transfer fluid selected from saturated and unsaturated fluorocarbons, hydrochlorofluorocarbons, (hydro)fluoroethers, hydrocarbons, carbon dioxide, dimethyl ether, ammonia and mixtures thereof and a perfluoropolyether. The two end groups of said perfluoropolyether can be independently functionalized or unfunctionalized: a typical functional end group is selected from esters, hydroxyls, amines, amides, cyanos, carboxylic acids and sulfonic acids.

Also, WO 2007/099055 (SOLVAY SOLEXIS S.P.A.) 7 Sep. 2007 discloses use as heat transfer fluids of compositions comprising hydrofluoropolyethers (HFPEs) and/or hydrofluoroethers (HFEs) in combination with a (per)fluoropolyether having end-groups selected from pyridine, ammine, aryl classes. No data are provided regarding heat transfer properties of said compositions.

However, heat transfer media of the prior art generally suffer from the disadvantage that they do not suitably protect against corrosion heat exchange surfaces which are generally made of metal materials, such as, e.g., copper, iron, steel, aluminium. Cooling circuits are indeed typically exposed to leaks in proximity to the joint seals or filler lines: thereby, when thermal cycles are performed, moisture can penetrate therein and promote corrosion of metal heat exchange surfaces.

Further, there is a continuous need of heat transfer media having improved thermal conductivity so as to reduce heat exchange surfaces of the heat exchange system and therefore size and weight of such system, thus optimizing the available useful space; this size reduction/miniaturization is particularly advantageous especially on board of aircrafts, wherein space availability can be an issue.

There thus remain a need in the art for a heat transfer medium having improved thermal conductivity while exhibiting outstanding anti-rust properties, said medium being thus suitable for being used in heat transfer circuits generally made of metal materials, in particular lightweight materials such as aluminium, aluminium/magnesium alloys, titanium for applications in aircrafts and vehicles in general, and thus enabling overcoming drawbacks of heat transfer fluids of the prior art.

DISCLOSURE OF INVENTION

It is thus an object of the present invention a process for transferring heat from a heat source to a heat sink, said process comprising using as heat transfer medium a composition comprising:
- at least one fluorinated fluid free from functional groups (fluid (H));
- at least one functional (per)fluoropolyether (functional PFPE(1)) comprising recurring units (R1), said recurring units comprising at least one ether linkage in the main chain and at least one fluorine atom (fluoropolyoxyalkylene chain), and at least one functional end group chosen between —COOH and —CONH$_2$;
- at least one functional (per)fluoropolyether (functional PFPE(2)) comprising recurring units (R1) as defined above and at least one functional end group chosen between —COCF$_3$ and its hydroxylated derivative —C(OH)$_2$CF$_3$.

The Applicant has found that the addition of said combination of functional (per)fluoropolyethers to said fluid (H) enables successfully improving thermal conductivity of the resulting heat transfer medium, making it possible to advantageously reduce the size and the weight of heat exchange surfaces while simultaneously advantageously protecting metallic surfaces of heat transfer systems from corrosion.

For the avoidance of doubt, the term "fluorinated fluid free from functional groups (fluid (H))" is hereby intended to denote a chemical compound comprising carbon and fluorine atoms which is free from functional groups, like notably —COOH and —CONH$_2$ groups. Optionally, the fluid (H) can comprise hydrogen atoms, halogen atoms different from fluorine atoms and/or ether oxygen atoms.

Among preferred fluorinated fluids free from functional groups (fluids (H)), mention can be made of saturated and unsaturated fluorocarbons (FCs), chlorofluorocarbons (CFCs) and hydrofluorocarbons (HFCs), hydrofluoroethers (HFEs), hydrofluoropolyethers (HFPEs), perfluoropolyethers (PFPEs).

The fluorinated fluid free from functional groups (fluid (H)) is preferably a fluorinated ether fluid free from functional groups (fluid (H-1)).

The fluorinated ether fluid free from functional groups (fluid (H-1)) is a chemical compound comprising carbon, fluorine and one or more ether oxygen atoms, said ether being free from functional groups, like notably —COOH and —CONH$_2$ groups. Optionally, the fluid (H-1) can comprise hydrogen atoms and/or halogen atoms different from fluorine atoms.

The fluorinated ether fluid free from functional groups (fluid (H-1)) typically complies with formula (I A) or (I B) here below:

$$RO—(R_f)_r—R' \quad (I\,A)$$

$$RO-J-(O)_j—R' \quad (I\,B)$$

wherein:
R and R', equal or different from each other, are independently chosen among —C$_m$F$_{2m+1}$, —C$_n$F$_{2n+1-h}$H$_h$, —C$_p$F$_{2p+1-h'}$H$_{h'}$, —C$_z$F$_{2z}$OC$_y$F$_{2y+1}$, —C$_u$F$_{2u-u'}$H$_{u'}$OC$_w$F$_{2w+1-w'}$H$_{w'}$, —C$_u$F$_{2u-u'}$H$_{u'}$OC$_y$F$_{2y+1}$ groups, with m, n, p, u, w, y, z being integers from 1 to 8, preferably from 1 to 7, h, h', u' and w' being integers 1, chosen so that h≤2n+1, h'≤2p+1, u'≤2u, w'≤2w+1, X being a halogen atom chosen among Cl, Br, I, preferably a chlorine atom;
r is equal to 0 or 1; j is equal to 0 or 1;
R$_f$ is a fluoropolyoxyalkylene chain comprising recurring units R$^o$, said recurring units being chosen among the group consisting of:
(i) —CFXO—, wherein X is F or CF$_3$;
(ii) —CF$_2$CFXO—, wherein X is F or CF$_3$,
(iii) —CFXCF$_2$O—, wherein X is F or CF$_3$,
(iv) —CF$_2$CF$_2$CF$_2$O—;
(v) —CF$_2$CF$_2$CF$_2$CF$_2$O—;
(vi) —(CF$_2$)$_k$—CFZ—O—, wherein k is an integer from 0 to 3 and Z is a group of general formula —OR$_F$T$_3$, wherein R$_F$ is a fluoropolyoxyalkylene chain comprising a number of recurring units from 0 to 10, said recurring units being chosen among the followings: —CFXO—, —CF$_2$CFXO—, —CF$_2$CF$_2$CF$_2$O—, —CF$_2$CF$_2$CF$_2$CF$_2$O—, with each of X being independently F or CF$_3$, and T$_3$ is a C$_1$-C$_5$ perfluoroalkyl group, and mixtures thereof;
J is a divalent hydrocarbon radical having 1 to 12 carbon atoms, linear or branched, aliphatic or aromatic, preferably an aliphatic divalent hydrocarbon group having 1 to 6 carbon atoms, e.g. —CH$_2$—, —CH$_2$CH$_2$— or —CH(CH$_3$)—.

The fluid (H-1) preferably complies with formula (II A) or (II B) here below:

$$R*O—(R_f)_r—R*' \quad (II\,A)$$

$$R*O-J-(O)_j—R*' \quad (II\,B),$$

wherein:
R* and R*', equal or different from each other, are independently chosen among —C$_m$F$_{2m+1}$, —C$_n$F$_{2n+1-h}$H$_h$, —C$_z$F$_{2z}$OC$_y$F$_{2y+1}$, —C$_u$F$_{2u-u'}$H$_{u'}$OC$_w$F$_{2w+1-w'}$H$_{w'}$, —C$_u$F$_{2u-u'}$H$_{u'}$OC$_y$F$_{2y+1}$ groups, with m, u, w, y, z being integers from 1 to 8, preferably from 1 to 7, h, u' and w' being integers ≥1, chosen so that h≤2n+1, u'≤2u, w'≤2w+1;
R$_f$, J, j and r have the same meaning as defined above.

The fluorinated ether fluid free from functional groups (fluid (H-1)) is preferably a hydrofluoroether (fluid (HFE)), a hydrofluoropolyether (fluid (HFPE)) or a perfluoropolyether (fluid (PFPE)).

The fluid (HFE) typically complies with formula (II A) or (II B) as described above, wherein:
r is equal to 0;
R* and R*', equal or different from each other, have the same meaning as defined above, with the proviso that at least one of R* and R*' in formula (II A) is a —C$_n$F$_{2n+1-h}$H$_h$ group or a —C$_u$F$_{2u-u'}$H$_{u'}$OC$_w$F$_{2w+1-w'}$H$_{w'}$ group, as defined above;
R$_f$, J and j have the same meaning as defined above.

According to a first embodiment of the invention, the fluid (HFE) complies with formula (II A) as described above, wherein r is 0, that is to say that fluid (HFE) complies with formula (III A-1) here below (fluid (HFE-1)):

$$R*O—R*' \quad (III\,A-1),$$

wherein:
R* and R*', equal or different from each other, are independently chosen among —C$_m$F$_{2m+1}$, —C$_n$F$_{2n+1-h}$H$_h$, —C$_z$F$_{2z}$OC$_y$F$_{2y+1}$ groups, with m, n, y, z being integers from 1 to 8, preferably from 1 to 7, h being integers ≥1, chosen so that h≤2n+1, with the proviso that at least one of R* and R*' is a —C$_n$F$_{2n+1-h}$H$_h$ group, as defined above.

Representative compounds of fluids (HFE-1) described by formula (III A-1) useful in the present invention include, but are not limited to, the following compounds and mixtures thereof: C$_3$F$_7$OCH$_3$, C$_4$F$_9$OCH$_3$, C$_4$F$_9$OC$_2$H$_5$, C$_7$F$_{15}$OC$_2$H$_5$.

According to a second embodiment of the invention, the fluid (HFE) is a fluid (HFE-2) having general formula (II B) as described above, wherein: —R* and R*', equal or different from each other, are independently chosen among —C$_m$F$_{2m+1}$, —C$_n$F$_{2n+1-h}$H$_h$, —C$_u$F$_{2u-u'}$H$_{u'}$OC$_w$F$_{2w+1-w'}$H$_{w'}$, —C$_u$F$_{2u-u'}$H$_{u'}$OC$_y$F$_{2y+1}$ groups, with m, n, u, w, y being integers from 1 to 8, preferably from 1 to 7, h, u' and w' being integers ≥1, chosen so that h≤2n+1, u'≤2u, w'≤2w+1;
J and j have the same meaning as defined above.

Non limitative examples of fluids (HFE-2) according to this second embodiment are notably CF$_3$CFHCF$_2$CH(CH$_3$)OCF$_2$CFHCF$_3$, CF$_3$CFHCF$_2$CH$_2$OCF$_2$CFHCF$_3$, CF$_3$CF(CH$_2$OCF$_2$CFHCF$_3$)CFHCF(CF$_3$)$_2$, CF$_3$CFHCF(CH$_2$OCF$_2$CFHCF$_3$)CF(CF$_3$)$_2$, CF$_3$CF[CH(CH$_3$)OCF$_2$CFHCF$_3$]CFHCF(CF$_3$)$_2$, CF$_3$CF[CH(CH$_3$)OCF$_2$CFHCF$_3$]CFHCF$_2$CF$_3$, CF$_3$CF$_2$CF[CH(CH$_3$)OCF$_2$CFHCF$_3$]CFHCF$_3$, CF$_3$CFHCF$_2$C(CH$_3$)$_2$OCF$_2$CFHCF$_3$, CF$_3$CFHCF$_2$CH$_2$OCF$_2$CFHOC$_4$F$_9$, CF$_3$CFHCF$_2$CH(OCF$_2$CFHCF$_3$)CH$_2$OCF$_2$CFHCF$_3$, CF$_3$CFHCF$_2$CH$_2$OCF$_2$CFHOC$_3$F$_7$, CF$_3$CFHCF$_2$CH$_2$OCF$_2$CFHOCF$_3$, CF$_3$CF$_2$CF$_2$OCH$_2$CH$_2$CH$_2$OCF$_2$CF$_2$CF$_3$, CF$_3$CF$_2$CF$_2$CF$_2$OCH$_2$CH$_2$CH$_2$OCF$_2$CF$_2$CF$_2$CF$_3$, CF$_3$CF$_2$CF$_2$OCH$_2$CH$_2$OCF$_2$CF$_2$CF$_3$, CF$_3$CF$_2$CF$_2$CF$_2$OCH$_2$CH$_2$CH$_2$OCF$_2$CF$_2$CF$_2$CF$_3$, CF$_3$CF$_2$CF[CF(CF$_3$)$_2$]OCH$_2$CH$_2$CH$_2$OCF[CF(CF$_3$)$_2$]CF$_2$CF$_3$.

Fluids (HFE-2) according to this second embodiment of the invention are notably those disclosed in US 2007051916 (3M INNOVATIVE PROPERTIES CO.) 8 Mar. 2007 or in U.S. Pat. No. 6,953,082 (3M INNOVATIVE PROPERTIES CO.) 11 Oct. 2005.

The fluorinated ether fluid free from functional groups (fluid (H-1)) is more preferably a fluid (HFPE) or a fluid (PFPE).

The fluid (HFPE) typically complies with formula (II A) as described above, wherein:
R* and R*', equal or different from each other, are independently chosen among —C$_m$F$_{2m+1}$, —C$_n$F$_{2n+1-h}$H$_h$, —C$_u$F$_{2u-u'}$H$_{u'}$OC$_w$F$_{2w+1-w'}$H$_{w'}$, —C$_u$F$_{2u-u'}$H$_{u'}$OC$_y$F$_{2y+1}$ groups, with m, n, u, w, y being integers from 1 to 8, preferably from 1 to 7, h, u' and w' being integers ≥1, chosen so that h≤2n+1, u'≤2u, w'≤2w+1, with the proviso that at least one of R* and R*' is a —$C_nF_{2n+1-h}H_h$ group, as defined above;

$R_f$ has the same meaning as defined above;

r is equal to 1.

The fluid (HFPE) is preferably a fluid (HFPE-1) having general formula (III A-2):

$$R*O—R_f'—R*'  \qquad (III\ A\text{-}2),$$

wherein:
- —R* and R*', equal or different from each other, are independently chosen between —$C_mF_{2m+1}$ and —$C_nF_{2n+1-h}H_h$ groups, with m, n being integers from 1 to 3, h being integer 1, chosen so that h≤2n+1, with the proviso that at least one of R* and R*' is a —$C_nF_{2n+1-h}H_h$ group, as defined above;

$R_f'$ is chosen among the followings:

(1) —$(CF_2O)_a$—$(CF_2CF_2O)_b$—$(CF_2$—$(CF_2)_{z'}$—$CF_2O)_c$, with a, b and c being integers up to 100, preferably up to 50, and z' being an integer equal to 1 or 2, a≥0, b≥0, c≥0 and a+b>0; preferably, each of a and b being >0 and b/a being comprised between 0.1 and 10;

(2) —$(C_3F_6O)_{c'}$—$(C_2F_4O)_b$—$(CFXO)_t$—, with X being, at each occurrence, independently selected among —F and —$CF_3$; b, c' and t being integers up to 100, c'>0, b≥0, t≥0; preferably, b and t>0, c'/b being comprised between 0.2 and 5.0 and (c'+b)/t being comprised between 5 and 50;

(3) —$(C_3F_6O)_{c'}$—$(CFXO)_t$—, with X being, at each occurrence, independently selected among —F and —$CF_3$; c' and t being integers up to 100, c'>0, t≥0, preferably t>0, c'/t being comprised between 5 and 50.

$R_f'$ in formula (III-A-2) is preferably selected among structures (1) and (2), as above detailed.

Non limitative examples of fluids (HFPE-1) described by formula (III A-2) are those notably complying with general formulae: $HCF_2O(CF_2CF_2O)CF_2H$; $HCF_2O(CF_2CF_2O)_2CF_2H$; $HCF_2O(CF_2CF_2O)_2(CF_2O)_2CF_2H$; $HCF_2O(CF_2CF_2O)_3CF_2H$; $HCF_2O(CF_2CF_2O)_3(CF_2O)_2CF_2H$; $HCF_2O(CF_2CF_2O)_4CF_2H$; $HCF_2O(CF_2CF_2O)_3CF_2OCF_2H$; $HCF_2O(CF_2CF_2O)_2(CF_2O)_2CF_2H$; $CF_3O(CF_2CF_2O)_2CF_2H$; $CF_3O(CF_2CF_2O)_4CF_2OCF_2H$; $CF_3O(CF_2CF_2O)_2(CF_2O)CF_2H$; $CF_3O(CF_2CF_2O)(CF_2O)_2CF_2H$; $CF_3O(CF_2CF_2O)_2(CF_2O)_2CF_2H$; $CF_3O(CF_2CF(CF_3)O)_2CF_2H$; $CF_3O(CF_2CF(CF_3)O)_3CF_2H$; $CF_3O(C_3F_6O)_2(CF(CF_3)O)CF_2H$; $HCF_2CF_2O(CF_2CF_2O)CF_2CF_2H$; $HCF_2CF_2OCF_2C(CF_3)_2CF_2OCF_2CF_2H$; $CH_3OCF_2CF_2OCH_3$; $CH_3O(CF_2CF_2O)_2CH_3$; $CH_3O(CF_2CF_2O)CF_2O)(CF_2CF_2O)CH_3$; $CH_3O(CF_2CF_2O)_3CH_3$; $CH_3O(CF_2CF_2O)(CF_2O)_2(CF_2CF_2O)CH_3$; $C_2H_5OCF_2CF_2OC_2H_5$; $C_2H_5O(CF_2CF_2O)_2C_2H_5$; $CH_3OCF_2H$; $CH_3OCF_2CF_2OCF_2H$; $CH_3OCF_2CF_2OCF_2OCF_2H$; $C_2H_5OCF_2H$; $C_2H_5OCF_2CF_2OCF_2H$; $C_2H_5O(CF_2CF_2O)_2CF_2H$.

Fluids (HFPE-1) of the invention are notably those available from Solvay Solexis S.p.A. under the tradenames H-GALDEN® ZT 60, H-GALDEN® ZT 85, H-GALDEN® ZT 100, H-GALDEN® ZT 130, H-GALDEN® ZT 150, H-GALDEN® ZT 180.

The fluid (PFPE) typically complies with formula (II A) as described above, wherein:
R* and R*', equal or different from each other, are independently chosen among —$C_mF_{2m+1}$ groups, with m being integers from 1 to 8, preferably from 1 to 7;

$R_f$ has the same meaning as defined above;

r is equal to 1.

The fluid (PFPE) is preferably a fluid (PFPE-1) having general formula (III A-3) here below:

$$R*O—R_f'—R*'  \qquad (III\ A\text{-}3)$$

wherein:
- —R* and R*', equal or different from each other, are independently chosen among —$C_mF_{2m+1}$ groups, with m being integers from 1 to 3;

$R_f'$ is chosen among the followings:

(1) —$(CF_2O)_a$—$(CF_2CF_2O)_b$—$(CF_2$—$(CF_2)_{z'}$—$CF_2O)_c$, with a, b and c being integers up to 100, preferably up to 50, and z' being an integer equal to 1 or 2, a≥0, b≥0, c≥0 and a+b>0; preferably, each of a and b being >0 and b/a being comprised between 0.1 and 10;

(2) —$(C_3F_6O)_{c'}$—$(C_2F_4O)_b$—$(CFXO)_t$—, with X being, at each occurrence, independently selected among —F and —$CF_3$; b, c' and t being integers up to 100, c'>0, b≥0, t≥0; preferably, b and t>0, c'/b being comprised between 0.2 and 5.0 and (c'+b)/t being comprised between 5 and 50;

(3) —$(C_3F_6O)_{c'}$—$(CFXO)_t$—, with X being, at each occurrence, independently selected among —F and —$CF_3$; c' and t being integers up to 100, c'>0, t≥0, preferably t>0, c'/t being comprised between 5 and 50.

$R_f'$ in formula (III A-3) is preferably selected among structures (3), as above detailed.

Non limitative examples of fluids (PFPE-1) are those notably available from Solvay Solexis S.p.A. under the tradenames GALDEN® HT 110, GALDEN® HT 135, GALDEN® HT 170.

Fluids (HFPE) and fluids (PFPE) have advantageously a viscosity at 20° C. of at most 20 cSt, preferably of at most 10 cSt, more preferably of at most 5 cSt.

The functional (per)fluoropolyethers, functional PFPE(1) and functional PFPE(2), of the present invention typically comply with formula (IV) here below:

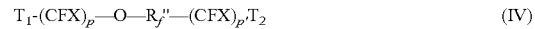
$$T_1\text{-}(CFX)_p\text{—O—}R_f''\text{—}(CFX)_{p'}\text{-}T_2  \qquad (IV)$$

wherein:
- each of X is independently F or $CF_3$; when X is F, p and/or p', equal or different from each other, are integers up to 3, p and p' being preferably equal to 1; when X is $CF_3$, p and/or p' are equal to 1;

$R_f''$ is a fluoropolyoxyalkylene chain comprising recurring units $R^{o'}$, said recurring units being chosen among the group consisting of:
(i) —CFXO—, wherein X is F or $CF_3$,
(ii) —$CF_2CFXO$—, wherein X is F or $CF_3$,
(iii) —$CF_2CF_2CF_2O$—,
(iv) —$CF_2CF_2CF_2CF_2O$—,
(v) —$(CF_2)_k$—CFZ—O— wherein k is an integer from 0 to 3 and Z is a group of general formula —$OR_FT_3$, wherein $R_F$ is a fluoropolyoxyalkylene chain comprising a number of recurring units from 0 to 10, said recurring units being chosen among the followings: —CFXO—, —$CF_2CFXO$—, —$CF_2CF_2CF_2O$—, —$CF_2CF_2CF_2CF_2O$—, with each of X being independently F or $CF_3$, and $T_3$ is a $C_1$-$C_3$ perfluoroalkyl group, and mixtures thereof;

in functional PFPE(1), at least one of $T_1$ and $T_2$, which are the same or different from each other, is a functional end group chosen between —COOH and —$CONH_2$, the remaining $T_1$ or $T_2$, if any, being a fluorine atom or a $C_1$-$C_3$ (per)fluoroalkyl group optionally containing H or Cl, preferably a fluorine atom or a $C_1$-$C_3$ perfluoroalkyl group, more preferably a fluorine atom;

in functional PFPE(2), at least one of $T_1$ and $T_2$, which are the same or different from each other, is a functional end group chosen between —$COCF_3$ and its hydroxylated derivative —$C(OH)_2CF_3$, the remaining $T_1$ or $T_2$, if any, being a fluorine atom or a $C_1$-$C_3$ (per)fluoroalkyl group optionally containing H or Cl, preferably a fluorine atom or a $C_1$-$C_3$ perfluoroalkyl group, more preferably a fluorine atom.

Preferred functional PFPE(1) and functional PFPE(2) are those complying with formula (V):

 (V)

wherein:
the perfluorooxyalkylene units with indexes m, n, r and s are randomly distributed along the chain, the values of m, n, r and s being such that the average molecular weight ranges from 400 to 20 000, preferably from 1 000 to 10 000, more preferably from 1 400 to 6 000;
$T_1$ and $T_2$ have the same meaning as defined above.

Most preferred functional PFPE(1) and functional PFPE (2) are those complying with formula (VI):

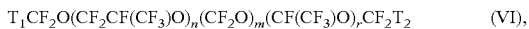
 (VI), wherein:
the perfluorooxyalkylene units with indexes m, n and r are randomly distributed along the chain, the values of m, n and r being such that the average molecular weight ranges from 400 to 20000, preferably from 1000 to 10000, more preferably from 1400 to 6 000;
$T_1$ and $T_2$ have the same meaning as defined above.

Mixtures of functional PFPE(1) and functional PFPE(2) of the invention described by formula (VI) are notably available from Solvay Solexis S.p.A. under the tradenames FOMBLIN® DA 305 and FOMBLIN® DA 306.

Functional PFPE(1) and functional PFPE(2) each have advantageously an average molecular weight ranging from 600 to 20 500, preferably from 1500 to 10500, more preferably from 2000 to 6500.

The heat transfer medium of the invention comprises advantageously at least 1% wt, preferably at least 3% wt, more preferably at least 5% wt with respect to the total weight of the composition of a mixture of functional PFPE(1) and functional PFPE(2).

The heat transfer medium of the invention comprises advantageously at most 20% wt, preferably at most 15% wt, more preferably at most 10% wt with respect to the total weight of the composition of a mixture of functional PFPE(1) and functional PFPE(2).

Heat transfer media comprising from 5 to 10% wt with respect to the total weight of the composition of mixture of functional PFPE(1) and functional PFPE(2) gave very satisfactory results in the process of the invention.

The process of the invention is particularly adapted for operating a secondary loop heat exchange system. In this view, the heat sink of the process of the invention can be a primary refrigeration system. Said primary refrigeration system can make use of an additional fluid which is used for cooling the heat transfer medium of the invention, which in turns is used for cooling final parts/devices.

Otherwise, the heat source of the process of the invention can be a primary heating system. Said primary heating system can make use of an additional fluid which is used for heating the heat transfer medium of the invention, which in turns is used for heating final parts/devices.

The process of the invention is particularly adapted, thanks to improved thermal conductivity combined with outstanding anti-rust properties, for heating or cooling compartments (e.g. food stuffs compartments, notably those comprised in transport trolleys) on board of aircrafts, vehicles or boats. To this aim, the heat source (or the heat sink) of the process of the invention can be a heating or cooling compartment, as above detailed, while the heat sink (or the heat source) can be a primary refrigeration system (or a primary heating system).

The invention will be now described in more detail with reference to the following examples whose purpose is merely illustrative and not limitative of the scope of the invention.

Raw Materials

Fluid-A is a mixture of hydrofluoropolyethers having boiling point from 120 to 155° C. mainly complying with formula $HCF_2O(CF_2CF_2O)_3CF_2OCF_2H$, commercially available from Solvay Solexis under trademark H-GALDEN®.

Fluid-B is a mixture of perfluoropolyethers of formula $CF_3O(CF_2CF(CF_3)O)_n(CF_2O)_mCF_3$ wherein n/m is 40, having a boiling point from 115 to 150° C., commercially available from Solvay Solexis under trademark GALDEN® HT.

FOMBLIN® DA 305 PFPE is a mixture of functional PFPEs of formula $CF_3O(CF_2CF(CF_3)O)_n(CF_2O)_m(CF(CF_3)O)_rCF_2T$, with T being —COOH (for 30% wt) or —COCF$_3$ (or its hydroxylated derivative —C(OH)$_2$CF$_3$) (for 70% wt), the ratio n/(m+r) being 15, and having an average molecular weight of 2 600.

FOMBLIN® DA 306 PFPE is a mixture of functional PFPEs of formula $CF_3O(CF_2CF(CF_3)O)_n(CF_2O)_m(CF(CF_3)O)_rCF_2T$ with T being —CONH$_2$ (for 30% wt) or —COCF$_3$ (or its hydroxylated derivative —C(OH)$_2$CF$_3$) (for 70% wt), and the ratio n/(m+r) is 15, and having an average molecular weight of 2 600.

FOMBLIN® DA 410 PFPE is a functional PFPE of formula $T_1CF_2O(CF_2CF_2O)_{s'}(CF_2O)_{m'}CF_2T_2$ wherein each of $T_1$ and $T_2$ is a —CH$_2$O—C$_6$H$_4$(NO$_2$)$_2$ groups, and the ratio s'/m' is 1.5, having an average molecular weight of 2 350.

FOMBLIN® Z-DIAC PFPE is a functional PFPE of formula $T_1CF_2O(CF_2CF_2O)_{s'}(CF_2O)_{m'}CF_2T_2$ wherein each of $T_1$ and $T_2$ is a —COOH group, the ratio s'/m' is 1.5, having an average molecular weight of 4 000.

Thermal Conductivity Measurements

Thermal conductivity measurements were carried out according to ASTM C1113-99 (Standard Test Method for Thermal Conductivity of Refractories by Hot Wire Platinum Resistance Thermometer Technique).

Anti-Rust Test Conditions

The apparatus consisted of a one liter glass vessel equipped with a stirrer and a water condenser. A glass support for the metal plate was placed at the bottom of the vessel. Little plates of aluminium alloy (50×150×2 mm) were used after being cleaned and degreased by treatment with n-hexane, washed with GALDEN® ZV60 PFPE having a boiling point of 60° C. and dried in an oven at 70° C. A weighed amount of fluorinated ether fluid (neat or formulated with a mixture of functional perfluoropolyethers) was introduced in the vessel so as the metal plate was completely immersed in the fluid under stirring. An amount of demineralised water ranging between 2 and 5% v/v was added to the vessel. The mixture was stirred at 500 rpm in order to produce a liquid flow and at the same time to homogeneously disperse the water phase into small droplets. The vessel was then heated by an external oil bath and temperature was controlled by an external heater controller. The bath temperature was set in order to have a fluid temperature of 90° C. and maintained for the pre-established duration of the test (150 hours; 300 hours; 500 hours).

EXAMPLE 1

A fluid composition was prepared by mixing 1108 g of fluid B, as above detailed, and 96 g of FOMBLIN® DA 306 PFPE. The composition is a clear, colourless and stable solution.

The anti-rust test was performed using a metal plate made of aluminium alloy ENAW 3103 H14. The vessel was filled with 700 ml of the above fluid composition and 14 ml (2% v/v) of demineralised water were added. The mixture was heated at 90° C. under vigorous stirring (500 rpm) for 500 hours. At the end the metal plate was unchanged with no trace of rust on its surface. The results for thermal conductivity measurements and the anti-rust tests are set forth in Table 1.

EXAMPLE 1C (COMPARATIVE)

The thermal conductivity of neat fluid B as above detailed was found to be 0.0460 W/(m·K).

The anti-rust test was performed as in Example 1 on neat fluid B. After 150 hours at 90° C., the metal plate showed corrosion on several parts of the surface.

EXAMPLE 2

A fluid composition was prepared by mixing 1084 g of fluid A, as above detailed, and 120 g of FOMBLIN® DA 305 PFPE. The composition is a clear, colourless and stable solution. The results for thermal conductivity measurements and the anti-rust tests are set forth in Table 1.

EXAMPLE 2C (COMPARATIVE)

The thermal conductivity of neat fluid A was found to be 0.076 W/(m·K) as set in Table 1.

EXAMPLE 3C (COMPARATIVE)

A fluid composition was prepared by mixing 1108 g of fluid A and 96 g of FOMBLIN® DA 410 PFPE. The composition is a clear, colourless and stable solution. The results for thermal conductivity measurements are set forth in Table 1.

EXAMPLE 4C (COMPARATIVE)

A fluid composition was prepared by mixing 1100 g of fluid A and 110 g of FOMBLIN® Z-DIAC PFPE. The composition is a clear, colourless and stable solution. The results for thermal conductivity measurements are set forth in Table 1.

TABLE 1

| Example | Fluid (H-1) | Functional PFPE | Thermal conductivity (W/(m · K)) | Anti-rust test |
|---|---|---|---|---|
| 1 | fluid B | FOMBLIN ® DA 306 PFPE | 0.0483 | passed |
| 2 | fluid A | FOMBLIN ® DA 305 PFPE | 0.078 | passed |
| 1C | fluid B | — | 0.0460 | failed |
| 2C | fluid A | — | 0.076 | failed |
| 3C | fluid A | FOMBLIN ® DA 410 PFPE | 0.061 | — |
| 4C | fluid A | FOMBLIN ® Z-DIAC PFPE | 0.066 | — |

Only the simultaneous addition of functional PFPE (1) and (2) (see Ex. 1 and 2) enables achieving a substantial enhancement of the thermal conductivity with respect to neat fluids, while addition of one single functional (per)fluoropolyethers like, notably, FOMBLIN® Z-DIAC PFPE having —COOH functional end groups or FOMBLIN® DA 410 PFPE having —CH$_2$O—C$_6$H$_4$(NO$_2$)$_2$ functional end groups (Comparative Examples 3C and 4C) does not provide any enhancement in thermal conductivity.

Also, anti-rust tests performed with the compositions of the present invention (Ex. 1 and 2) showed no signs of corrosion with respect to neat fluids (H) (Comparative Example 1C and 2C).

The invention claimed is:

1. A process for transferring heat from a heat source to a heat sink, said process comprising using as heat transfer medium a composition comprising:
   at least one fluorinated ether fluid free from functional groups (fluid (H-1)), wherein the fluid H-1 is a hydrofluoropolyether fluid (fluid (HPFE)) or a perfluoropolyether fluid (fluid (PFPE)) having a viscosity at 20° C. of less than 10 cSt;
   at least one functional (per)fluoropolyether (functional PFPE(1)) comprising recurring units (R1), said recurring units comprising at least one ether linkage in the main chain and at least one fluorine atom (fluoropolyoxyalkylene chain), and at least one functional end group selected from the group consisting of —COOH and —CONH$_2$; and
   at least one functional (per)fluoropolyether (functional PFPE(2)) comprising recurring units (R1) as defined above and at least one functional end group selected from the group consisting of —COCF$_3$ and its hydroxylated derivative —C(OH)$_2$CF$_3$.

2. The process of claim 1, wherein the fluorinated ether fluid free from functional groups (fluid (H-1)) complies with formula (I A) or (I B) here below:

RO—(R$_f$)$_r$—R'      (I A)

RO-J-(O)$_j$—R'       (I B)

wherein:
   R and R', equal or different from each other, are independently selected from the group consisting of —C$_m$F$_{2m+1}$, —C$_n$F$_{2n+1-h}$H$_h$, —C$_p$F$_{2p+1-h'}$X$_{h'}$, —C$_z$F$_{2z}$OC$_y$F$_{2y+1}$, —C$_u$F$_{2u-u'}$H$_{u'}$OC$_w$F$_{2w+1-w'}$H$_{w'}$, and —C$_u$F$_{2u-u'}$H$_{u'}$OC$_y$F$_{2y+1}$ groups, with m, n, p, u, w, y, z being integers from 1 to 8, h, h', u' and w' being integers ≥1, chosen so that h≤2n+1, h'≤2p+1, u'≤2u, w'≤2w+1, X being a halogen atom selected from the group consisting of Cl, Br, and I;
   r is equal to 0 or 1; j is equal to 0 or 1;
   R$_f$ is a fluoropolyoxyalkylene chain comprising recurring units R°, said recurring units being selected from the group consisting of:
   (i) —CFXO—, wherein X is F or CF$_3$;
   (ii) —CF$_2$CFXO—, wherein X is F or CF$_3$;
   (iii) —CF$_2$CF$_2$O—;
   (iv) —CF$_2$CF$_2$CF$_2$O—;
   (v) —(CF$_2$)$_k$—CFZ—O—, wherein k is an integer from 0 to 3, and Z is a group of general formula —OR$_F$T$_3$, wherein R$_F$ is a fluoropolyoxyalkylene chain comprising a number of recurring units from 0 to 10, said recurring units being selected from the group consisting of —CFXO—, —CF$_2$CFXO—, —CF$_2$CF$_2$CF$_2$O—, and —CF$_2$CF$_2$CF$_2$CF$_2$O—, with each of X being independently F or CF$_3$, and T$_3$ is a C$_1$-C$_5$ perfluoroalkyl group; and
   mixtures thereof; and
   J is a divalent hydrocarbon radical having 1 to 12 carbon atoms, linear or branched, aliphatic or aromatic.

3. The process of claim 1, wherein the fluid (H-1) complies with formula (II A) or (II B) here below:

R*O—(R$_f$)$_r$—R*'     (II A)

R*O-J-(O)$_j$—R*'       (II B), wherein:
R* and R*', equal to or different from each other, are independently selected from the group consisting of $-C_mF_{2m+1}$, $-C_nF_{2n+1-h}H_h$, $-C_zF_{2z}OC_yF_{2y+1}$, $-C_uF_{2u-u'}H_{u'}OC_wF_{2w+1-w'}H_{w'}$, and $-C_uF_{2u-u'}H_{u'}OC_yF_{2y+1}$ groups, with m, u, w, y, z being integers from 1 to 8, h, u' and w' being integers ≥1, chosen so that h≤2n+1, u'≤2u, w'≤2w+1;

$R_f$ is a fluoropolyoxyalkylene chain comprising recurring units $R^o$, said recurring units being selected from the group consisting of:
(i) $-CFXO-$, wherein X is F or $CF_3$;
(ii) $-CF_2CFXO-$, wherein X is F or $CF_3$;
(iii) $-CF_2CF_2CF_2O-$;
(iv) $-CF_2CF_2CF_2CF_2O-$;
(v) $-(CF_2)_k-CFZ-O-$, wherein k is an integer from 0 to 3, and Z is a group of general formula $-OR_FT_3$, wherein $R_F$ is a fluoropolyoxyalkylene chain comprising a number of recurring units from 0 to 10, said recurring units being selected from the group consisting of $-CFXO-$, $-CF_2CFXO-$, $-CF_2CF_2CF_2O-$, and $-CF_2CF_2CF_2CF_2O-$, with each of X being independently F or $CF_3$, and $T_3$ is a $C_1-O_5$ perfluoroalkyl group; and
mixtures thereof;

J is a divalent hydrocarbon radical having 1 to 12 carbon atoms, linear or branched, aliphatic or aromatic;
r is equal to 0 or 1; and
j is equal to 0 or 1.

4. The process of claim 1, wherein the fluid (HFPE) complies with formula (II A):

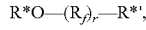
R*O—(R_f)_r—R*', wherein:
R* and R*', equal to or different from each other, are independently selected from the group consisting of $-C_mF_{2m+1-h}H_h$, $-C_uF_{2u-u'}H_{u'}OC_wF_{2w+1-w'}H_{w'}$, and $-C_uF_{2u-u'}H_{u'}OC_yF_{2y+1}$ groups, with m, n, u, w, y being integers from 1 to 8, h, u' and w' being integers ≥1, chosen so that h≤2n+1, u'≤2u, w'≤2w+1, with the proviso that at least one of R* and R*' is a $-C_nF_{2n+1-h}H_h$ group;

$R_f$ is a fluoropolyoxyalkylene chain comprising recurring units $R^o$, said recurring units being selected from the group consisting of:
(i) $-CFXO-$, wherein X is F or $CF_3$;
(ii) $-CF_2CFXO-$, wherein X is F or $CF_3$;
(iii) $-CF_2CF_2CF_2O-$;
(iv) $-CF_2CF_2CF_2CF_2O-$;
(v) $-(CF_2)_k-CFZ-O-$, wherein k is an integer from 0 to 3, and Z is a group of general formula $-OR_FT_3$, wherein $R_F$ is a fluoropolyoxyalkylene chain comprising a number of recurring units from 0 to 10, said recurring units being selected from the group consisting of $-CFXO-$, $-CF_2CFXO-$, $-CF_2CF_2CF_2O-$, and $-CF_2CF_2CF_2CF_2O-$, with each of X being independently F or $CF_3$, and $T_3$ is a $C_1-O_5$ perfluoroalkyl group; and
mixtures thereof; and
r is equal to 1.

5. The process of claim 1, wherein the fluid (PFPE) complies with formula (II A):

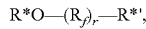
R*O—(R_f)_r—R*', wherein:
R* and R*', equal to or different from each other, are independently selected from the group consisting of $-C_mF_{2m+1}$ groups, with m being integers from 1 to 8;

$R_f$ is a fluoropolyoxyalkylene chain comprising recurring units $R^o$, said recurring units being selected from the group consisting of:
(i) $-CFXO-$, wherein X is F or $CF_3$;
(ii) $-CF_2CFXO-$, wherein X is F or $CF_3$;
(iii) $-CF_2CF_2CF_2O-$;
(iv) $-CF_2CF_2CF_2CF_2O-$;
(v) $-(CF_2)_k-CFZ-O-$, wherein k is an integer from 0 to 3, and Z is a group of general formula $-OR_FT_3$, wherein $R_F$ is a fluoropolyoxyalkylene chain comprising a number of recurring units from 0 to 10, said recurring units being selected from the group consisting of $-CFXO-$, $-CF_2CFXO-$, $-CF_2CF_2CF_2O-$, and $-CF_2CF_2CF_2CF_2O-$, with each of X being independently F or $CF_3$, and $T_3$ is a $C_1-O_5$ perfluoroalkyl group; and
mixtures thereof; and
r is equal to 1.

6. The process of claim 1, wherein the functional PFPE(1) and the functional PFPE(2), comply with formula (IV) here below:

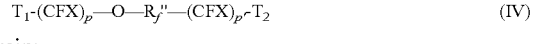
$T_1-(CFX)_p-O-R_f''-(CFX)_{p'}-T_2$ (IV)

wherein:
each of X is independently F or $CF_3$; when X is F, p and/or p', equal to or different from each other, are integers up to 3; when X is $CF_3$, p and/or p' are equal to 1;

$R_f''$ is a fluoropolyoxyalkylene chain comprising recurring units $R^{o'}$, said recurring units being selected from the group consisting of:
(i) $-CFXO-$, wherein X is F or $CF_3$,
(ii) $-CF_2CFXO-$, wherein X is F or $CF_3$,
(iii) $-CF_2CF_2CF_2O-$,
(iv) $-CF_2CF_2CF_2CF_2O-$,
(v) $-(CF_2)_k-CFZ-O-$ wherein k is an integer from 0 to 3, and Z is a group of general formula $-OR_FT_3$, wherein $R_F$ is a fluoropolyoxyalkylene chain comprising a number of recurring units from 0 to 10, said recurring units being selected from the group consisting of $-CFXO-$, $-CF_2CFXO-$, $-CF_2CF_2CF_2O-$, and $-CF_2CF_2CF_2CF_2O-$, with each of X being independently F or $CF_3$, and $T_3$ is a $C_1$-$C_3$ perfluoroalkyl group; and
mixtures thereof;

in functional PFPE(1), at least one of $T_1$ and $T_2$, which are the same or different from each other, is a functional end group selected from the group consisting of $-COOH$ and $-CONH_2$, the remaining $T_1$ or $T_2$, if any, being a fluorine atom or a $C_1$-$C_3$ (per)fluoroalkyl group optionally containing H or Cl; and in functional PFPE(2), at least one of $T_1$ and $T_2$, which are the same or different from each other, is a functional end group selected from the group consisting of $-COCF_3$ and its hydroxylated derivative $-C(OH)_2CF_3$, the remaining $T_1$ or $T_2$, if any, being a fluorine atom or a $C_1$-$C_3$ (per)fluoroalkyl group optionally containing H or Cl.

7. The process of claim 6, wherein the functional PFPE(1) and the functional PFPE(2) comply with formula (V):

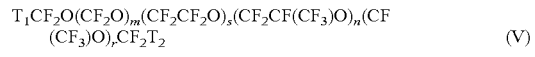
$T_1CF_2O(CF_2O)_m(CF_2CF_2O)_s(CF_2CF(CF_3)O)_n(CF(CF_3)O)_rCF_2T_2$ (V)

wherein:
the perfluorooxyalkylene units with indexes m, n, r and s are randomly distributed along the chain, the values of m, n, r and s being such that the average molecular weight ranges from 400 to 20,000.

8. The process of claim 1, wherein the heat transfer medium comprises from 5 to 10% wt with respect to the total weight of the composition of a mixture of functional PFPE (1) and functional PFPE (2).

9. The process of claim 1, wherein the heat sink is a primary refrigeration system.

10. The process of claim 1, wherein the heat source is a primary heating system.

11. The process of claim 1, wherein the heat source is a cooling compartment on board of aircrafts, vehicles or boats, while the heat sink is a primary refrigeration system.

12. The process of claim 1, wherein the heat sink is a heating compartment on board of aircrafts, vehicles or boats, while the heat source is a primary heating system.

13. The process of claim 1, wherein the functional PFPE(1) and the functional PFPE(2) are two distinct compounds.

* * * * *